United States Patent Office.

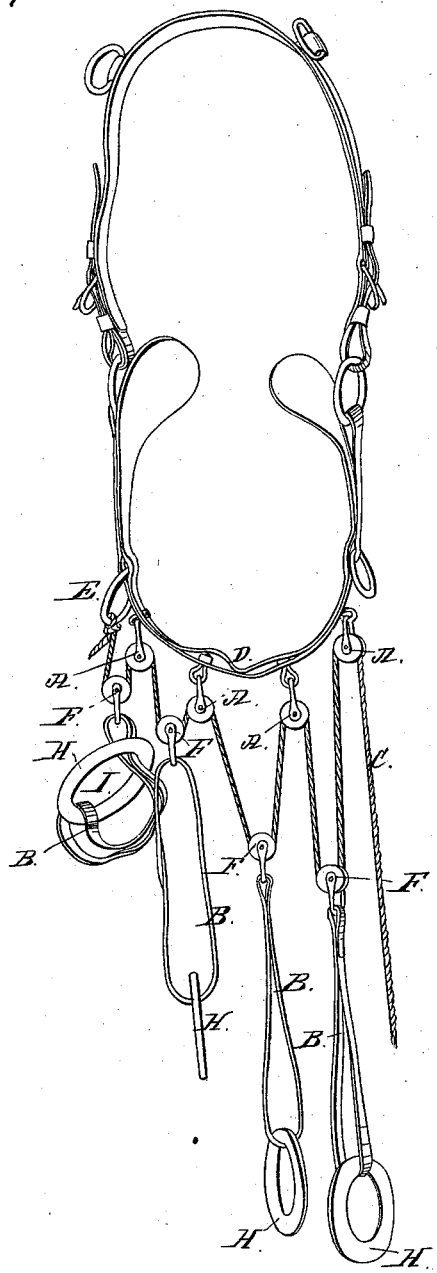

PETER R. SANDERSON, OF CALEDONIA, NEW YORK.

Letters Patent No. 71,914, dated December 10, 1867.

IMPROVEMENT IN APPARATUS FOR TAMING WILD ANIMALS.

The Schedule referred to in these Letters Patent and making part of the same.

TO WHOM IT MAY CONCERN:

Be it known that I, PETER R. SANDERSON, of Caledonia, in the county of Livingston, and State of New York, have invented a new and useful Apparatus for Taming Wild Animals; and I do declare that the following is a true and accurate description thereof, reference being had to the accompanying drawings, and to the letters of reference marked thereon, and making a part of this specification.

The object of my invention is to make a tackle or apparatus by which wild animals can be brought under control and effectually tamed.

It consists of a series of four sheaves A A A A attached to any circingle, D. Through these sheaves, having first fastened it to the ring E, and passing it through the sheave F', I pass the rope C, taking care to pass it alternately through the sheaves F and A. To the sheaves F F F F, I attach proper straps B B B B, provided at their lower ends with rings H H H H, which rings are intended to slip up on the straps B B B B, and form a noose, as at I, to pass around the ankles of the animal being operated upon. After the nooses are placed on the ankles, by pulling the rope C the animal can be controlled by being compelled to raise one foot from the ground, or all his feet, if necessary to throw him.

My apparatus can be constructed and attached to any circingle provided with a back-band, as shown in the drawing, or it can be attached to any harness.

What I claim as my invention, and desire to secure by Letters Patent, is—

The construction and use of a circingle-strap, as described, with the sheaves A A A A, and their attachments to said circingle, and the slipping-straps B B B B, and rope C, when arranged substantially as described for the purpose specified.

Also, the combination of the above parts, A A, &c., B B, &c., and C, with any harness, arranged substantially as described for the purpose designed.

PETER R. SANDERSON.

Witnesses:
H. HANNAMAN,
H. G. S. SPRAGUE.